United States Patent [19]

Anderson et al.

[11] Patent Number: 4,912,940
[45] Date of Patent: Apr. 3, 1990

[54] REFRIGERANT EVAPORATOR SUITABLE FOR REMOTE MOUNTING

[75] Inventors: Lowell M. Anderson, Bloomington; Leland L. Howland, Belle Plaine; Ambrose Tao, Burnsville, all of Minn.

[73] Assignee: Thermo King Corporation, Minneapolis, Minn.

[21] Appl. No.: 351,499

[22] Filed: May 15, 1989

[51] Int. Cl.⁴ .............................................. B60H 3/04
[52] U.S. Cl. ...................................... 62/239; 62/295; 62/297; 62/575
[58] Field of Search .................. 62/239, 295, 297, 515

[56] References Cited

U.S. PATENT DOCUMENTS

| | | | |
|---|---|---|---|
| 3,907,050 | 9/1975 | Mullings | 62/297 |
| 4,551,986 | 11/1985 | Anderson et al. | 62/239 |
| 4,633,767 | 1/1987 | Sain | 62/239 |
| 4,672,818 | 6/1987 | Roth | 62/239 |
| 4,685,306 | 8/1987 | Howland et al. | 62/117 |
| 4,711,095 | 12/1987 | Howland et al. | 62/117 |
| 4,736,597 | 4/1988 | Anderson et al. | 62/239 |
| 4,811,569 | 3/1989 | Welch et al. | 62/239 |

OTHER PUBLICATIONS

Thermo King Brochure—TK 9179—10/85.
Thermo King Brochure—TK 9194—5/87.

Primary Examiner—Ronald C. Capossela
Attorney, Agent, or Firm—D. R. Lackey

[57] ABSTRACT

A refrigerant evaporator assembly suitable for remote mounting to a ceiling of a trailer compartment having a served space to be conditioned. The evaporator assembly is modular, including an evaporator module, a cover module, and an evaporator blower module. The evaporator and cover modules cooperatively define a tubular housing having first and second open ends, with the blower module removably closing the second open end. A grille covers the first open end. The evaporator module includes a base member which functions as a support base for the evaporator module during assembly of the module and as a drain pan in the refrigerant evaporator assembly. The cover module functions as a support base for the evaporator coil when the evaporator assembly is mounted to the ceiling of a trailer compartment.

7 Claims, 3 Drawing Sheets

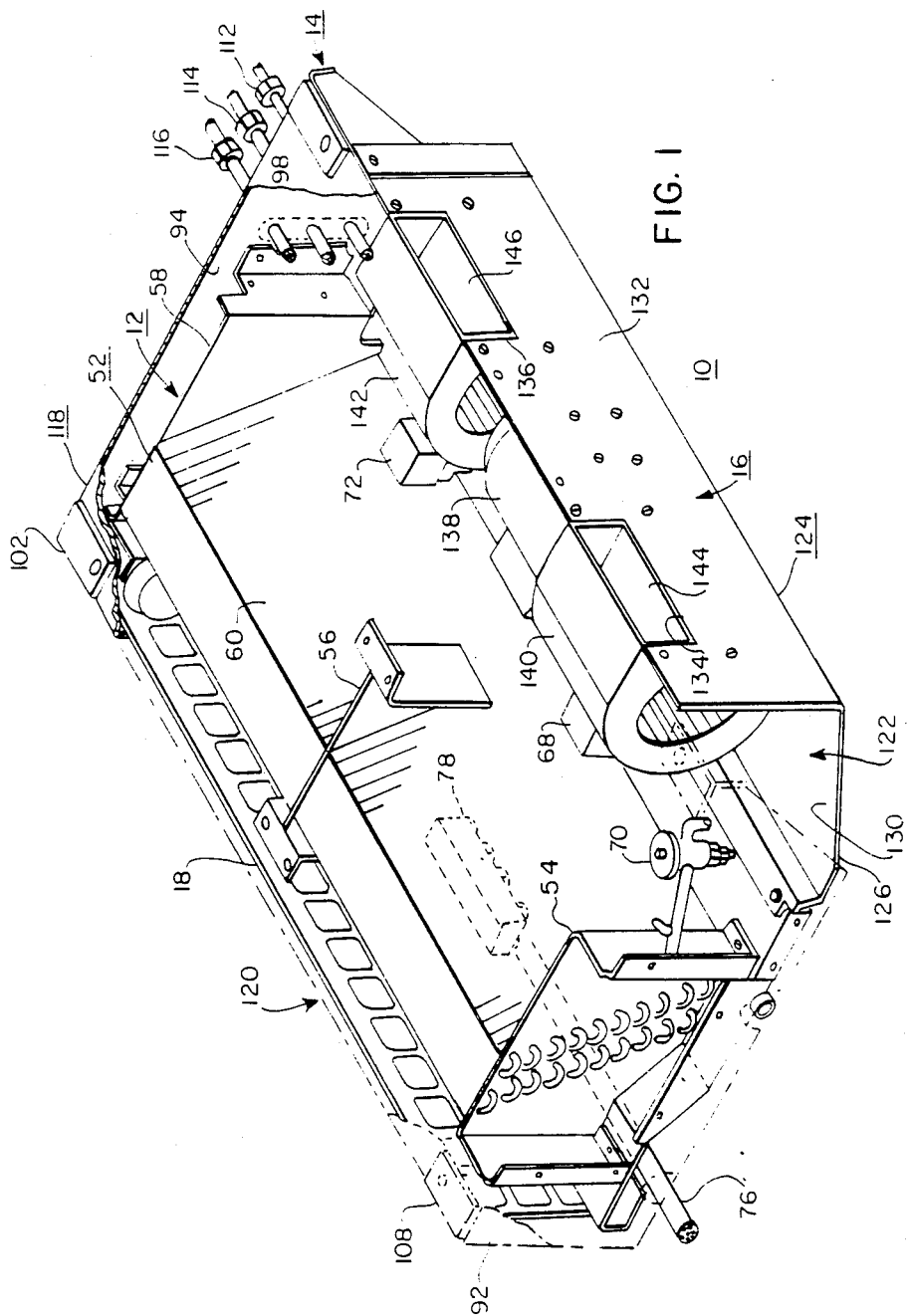

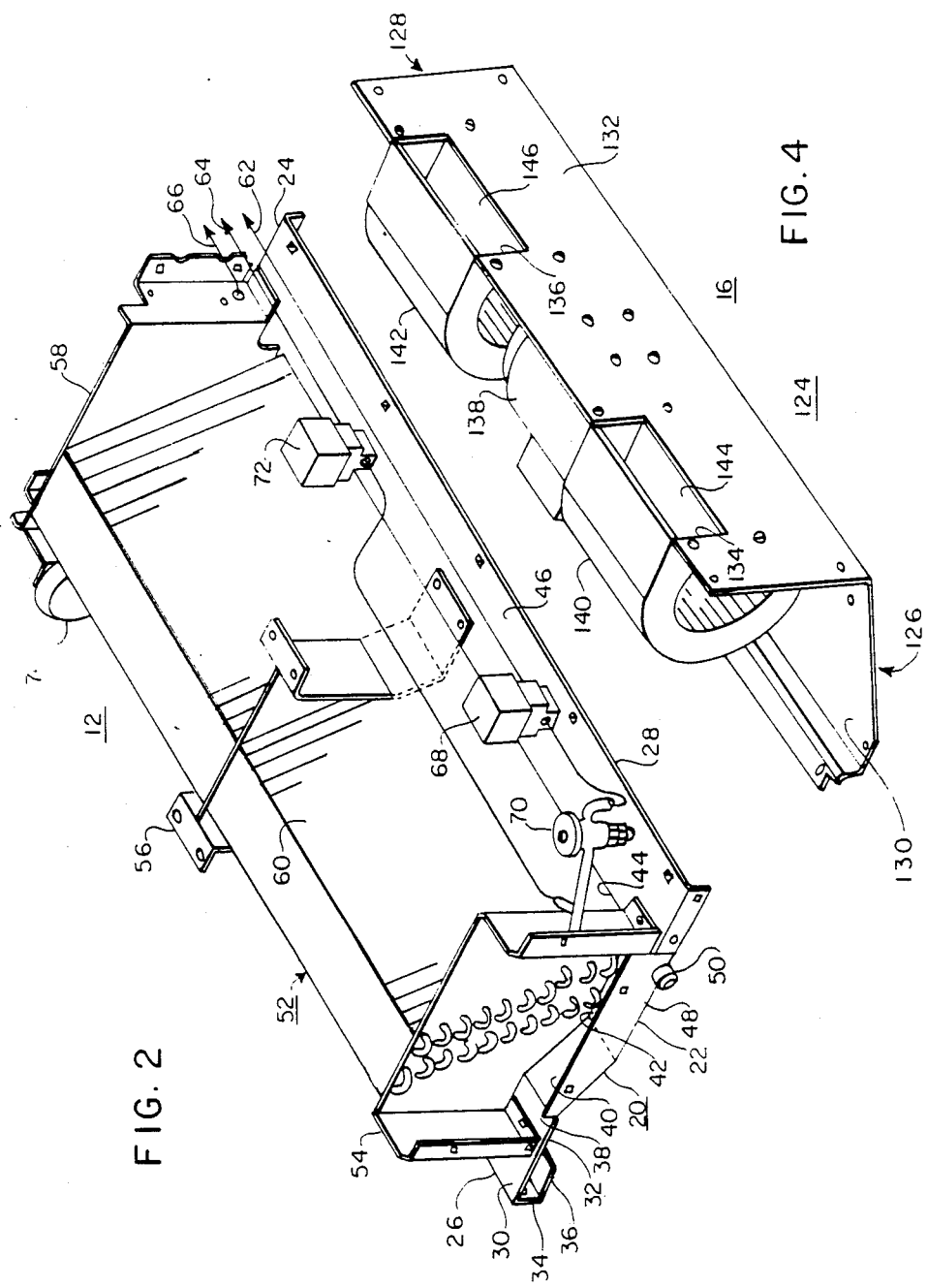

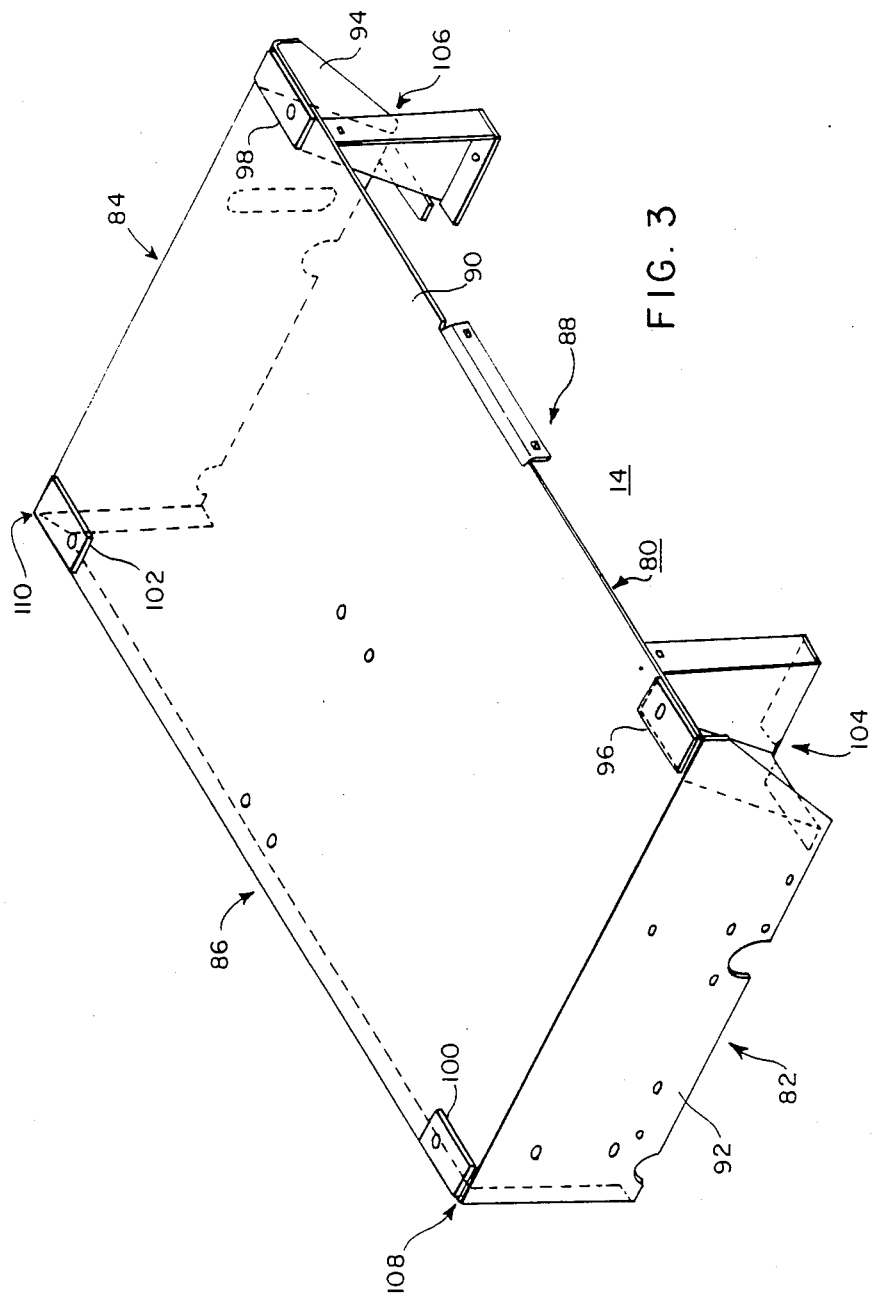

4,912,940

REFRIGERANT EVAPORATOR SUITABLE FOR REMOTE MOUNTING

TECHNICAL FIELD

The invention relates to transport refrigeration systems, and more specifically to transport refrigeration systems having a remote evaporator assembly.

BACKGROUND ART

It is common in the field of transport refrigeration to independently control the temperature of served spaces in two or more compartments of a trailer from a single main refrigeration unit, called the host unit. For example, a trailer may carry a frozen load in a front compartment, which is controlled by the host unit mounted on the front of the trailer, and fresh loads in one or more remote compartments which are controlled by remote evaporators connected to the host unit. U.S. Pat. Nos. 4,685,306 and 4,711,095, which are assigned to the same assignee as the present application, illustrate detailed refrigeration and electrical circuits for compartmentalized transport refrigeration systems, and these patents are hereby incorporated into the specification of the present application by reference.

In the prior art a housing having one open side is provided, and the refrigerant and electrical components of the remote evaporators are all assembled within the housing. A cover is then removably secured to the open side of the housing. When a user receives a remote evaporator for installation, the housing must be opened by removing the cover, in order to make refrigerant and electrical connections to the evaporator assembly.

For proper air circulation as well as for reducing intrusion into useful cargo space, it is desirable to mount the remote evaporator on the ceiling of the associated compartment. For installing and servicing prior art ceiling mounted units, the cover, which is on the bottom of the housing, must be removed, and all of the components are directly overhead, making it awkward to work on the inside of the unit.

It would be desirable, and it is an object of the present invention to improve the manufacturing, installation and servicing of remote evaporator units for transport refrigeration systems.

DISCLOSURE OF THE INVENTION

Briefly, the present invention is a new and improved remote evaporator assembly suitable for mounting from a ceiling of a trailer compartment defining a space to be conditioned. The remote evaporator is modular in construction, permitting off-line assembly of the modules to provide flexibility in assembly procedures, as well as assembly line balance.

An evaporator coil module and a cover module cooperatively define a tubular housing having first and second open ends. The first end is closed by a removable grille, through which return air from the served space passes. The second end is closed by a removable blower module, which discharges conditioned air back into the served space. Thus, components within the tubular housing may be easily accessed by either removing the grille, or the blower module, permitting servicing from either or ends of the unit, instead of having to work on components mounted directly overhead. The blower module may be removed and serviced remotely from the rest of the unit.

The new evaporator assembly makes it unnecessary to open the housing of the unit for installation or electrical diagnostic tests. Hot gas, suction and liquid lines are all attached to connections external to the housing. An external electrical harness from the host control panel is connected to one or more terminal boards which are mounted on the external surface of the main unit housing, permitting access to terminal boards during initial installation and for diagnostic tests by simply removing a small access cover.

The evaporator module is constructed on a base member which provides support for the evaporator, refrigeration circuit and refrigeration components, and electrical circuits and electrical components during manufacture. The cover module then provides support for the evaporator once the evaporator assembly is mounted to and supported from the ceiling, permitting the base member, which now functions as a drain pan, to be removed, if necessary, such as for cleaning. The base member need not be removed during installation or normal service work, however, as these functions may be performed simply by removing the grille at one end of the housing, or the blower module at the other end.

BRIEF DESCRIPTION OF THE DRAWINGS

The invention will become more apparent by reading the following detailed description in conjunction with the drawings, which are shown by way of example only, wherein:

FIG. 1 is a perspective view of a refrigerant evaporator assembly, with part of the cover cut away, constructed according to the teachings of the invention;

FIG. 2 is a perspective view of an evaporator module, which is used to construct the evaporator assembly shown in FIG. 1;

FIG. 3 is a perspective view of a cover module, which, when assembled with the evaporator module shown in FIG. 2, forms a tubular housing having first and second open ends; and FIG. 4 is a perspective view of an evaporator blower module which closes one of the open ends of the housing defined by the assembled cover and evaporator modules.

DESCRIPTION OF PREFERRED EMBODIMENTS

Referring now to the drawings, and to FIG. 1 in particular, there is shown a refrigerant evaporator assembly 10 constructed according to the teachings of the invention. Evaporator assembly 10 includes an evaporator module 12, shown un-assembled from assembly 10 in FIG. 2; a cover module 14 shown partially cut away and partially in phantom in FIG. 1, and un-assembled in FIG. 3; and an evaporator blower module 16 shown unassembled in FIG. 4. A grille 18 completes evaporator assembly 10.

The evaporator module 12 shown in FIG. 2 includes an metallic base member 20 having first and second axial ends 22 and 24, respectively, first and second sides 26 and 28, respectively, and upper and lower surfaces 30 and 32, respectively. The first side 26 of base member 20 is downwardly and inwardly flanged from end 22 to end 24, as indicated by vertical and horizontal flanges 34 and 36, respectively.

Base member 20 extends from the first side 26 to the second side 28 via a horizontally oriented portion 38, a downwardly sloping portion 40, a horizontally oriented portion 42, a vertically oriented upwardly stepped portion 44, and a horizontally oriented portion 46, which are all integrally connected in the recited order. Base member 20 functions as a drain pan for evaporator condensation, and side walls and drain tubes are provided at each end, such as side wall 48 and drain tube 50 shown at the first axial end 22.

An evaporator coil 52 is mounted on base member 20, with evaporator coil 52 having header plates 54, 56 and 58 which also function as mounting brackets. Evaporator coil 52 starts at the lowermost horizontal portion 42 of base member 20 and angles upwardly in a direction toward the first side 26. The skewed mounting of evaporator coil 52 on base member 20 maximizes the surface area of the air intake and outlet planes of evaporator coil 52, such as air outlet plane 60, for a given height dimension of assembly 10.

Evaporator module 12 supports all of the refrigeration and electrical control components of the evaporator assembly, with all refrigerant circuit piping and refrigeration components being mounted between the second side 28 of base member 20 and the evaporator coil 52. The refrigerant circuit includes a liquid line 62, a hot gas line 64, and a suction line 66. The liquid line 62 is connected to evaporator coil 52 via a liquid line solenoid valve 68 and an expansion valve 70. The hot gas line 64 is connected to evaporator coil 52 via a hot gas line solenoid valve 72, by-passing expansion valve 70. The suction line 66 may be directly connected to evaporator coil 52, as illustrated, or in some embodiments it may be connected to evaporator coil via a suction line solenoid valve.

Electrical controls may be mounted on both sides of evaporator coil 52. For example, a defrost air switch 74 and thermostat sensor (not shown) may be mounted adjacent the first side 26, and a defrost termination switch (not shown) may be mounted adjacent the second side 28. Electrical resistance heaters (not shown) for defrosting the evaporator coil 52 may be mounted adjacent to each of the intake and exit face planes or major sides of evaporator coil 52.

As shown in FIG. 1, a wiring harness 76 from the host unit control is connected to one or more electrical terminal blocks 78 mounted on the lower surface 32 of base member 20. An access cover (not shown) is disposed to cover terminal blocks 78, with the access cover being easily opened from a vantage position below assembly 10 during initial installation and diagnostic tests.

The cover module 14 shown in FIG. 3 includes an elongated metallic cover member 80 having first and second axial ends 82 and 84, respectively, and first and second sides 86 and 88, respectively. Cover member 80 has a substantially inverted U-shaped configuration, including a bight portion 90 and first and second depending leg portions 92 and 94 respectively disposed at the first and second ends 82 and 84 of cover module 14. Mounting pads 96, 98, 100 and 102 are provided at the four corners 104, 106, 108 and 110, respectively, of bight 90, having openings for receiving studs which project downwardly from the ceiling of a trailer compartment which is to receive a remote evaporator assembly 10. Corners 104 and 106 have a "stepped" structure such that the ceiling studs of the associated trailer will be outside the housing of evaporator assembly 10, for mounting ease. Corners 108 and 110 overhang the evaporator module 12 when cover module 14 is assembled therewith, permitting the ceiling studs to be easily reached for assembly of mounting nuts, prior to securing grille 18 to the assembly 10.

As shown in FIG. 1, cover module 14 includes connections 112, 114 and 116 for the liquid, hot gas and suction lines 62, 64 and 66, respectively, with connections 112, 114 and 116 being on the outside of cover module 14.

Cover module 14 is bolted to evaporator module 12, providing a housing 118 for evaporator assembly 10 having first and second open ends 120 and 122, respectively, when grille 18 and blower module 16 are not attached to the open ends. Thus, certain of the electrical components may be reached by removing grille 18 from the first end 120, and the remaining electrical components and all of the refrigeration circuits and components may be reached by removing the blower module 16 from the second end 122.

When cover module 14 is bolted to evaporator module 12, the liquid, hot gas and suction lines 62, 64 and 66 are soldered to the ends of connections 112, 114 and 116 which extend inside of housing 118, during initial factory assembly of evaporator assembly 10. Thus, while base member 20 provides a base for evaporator coil 52 during assembly of evaporator module 12, the cover module 14, after installation of assembly 10 in a truck/trailer compartment, becomes a more or less permanent base for evaporator coil 52. The cover module 14 is fixed to the ceiling of a trailer compartment, forming a mounting base which will not normally be removed from evaporator assembly 10 during installation or maintenance. Thus, while the cover module 14 is referred to as a "cover", after installation of assembly in its intended environment, the cover module 14 becomes the mounting base for the evaporator coil 52. This is even more apparent by the fact that the base member 20, which functions as a drain pan, may be unbolted from assembly 10 after installation, if desired. Normally, it will be unnecessary to remove base member 20 from assembly 10, as full access to the electrical and refrigeration components inside housing 118 may be gained by simply removing grille 18 from the first end 120 of housing 118, and/or blower module 16 from the second end 122 of housing 118. However, if it is desired to clean the upper surface of base member 20, base member 20 may be removed from assembly 10.

The evaporator blower module 16 shown in FIG. 4 includes an elongated metallic mounting base member 124 having first and second axial ends 126 and 128, respectively. Mounting base member 124 has an L-shaped or right angle configuration, including a horizontally oriented leg member 130 and an upstanding vertically oriented leg member 132. Leg member 132 functions as the air discharge end of assembly 10 when module 16 is attached to the second open end 122 of housing 118, and it includes first and second openings or rectangular notches 134 and 136 through which blower module 16 discharges conditioned air into an associated served space.

Blower module 16 includes an electric motor 138 which has two mounting bases, one connected to each of the leg members 130 and 132, for rigidizing the module. Motor 138 is double ended, driving first and second centrifugal blowers 140 and 142, respectively. Blowers 140 and 142 are mounted to the vertically oriented leg member 132, and they have their outlets 144 and 146 in registry with openings or notches 134 and 136, respectively.

Blowers 140 and 142 draw return air from the associated trailer compartment into evaporator assembly 10 via grille 18, causing the return air to flow through the evaporator coil 52. The conditioned air then flows into the "eyes" of the blowers 140 and 142 and out the blower discharge outlets 144 and 146.

In the installation of assembly 10 in the compartment of a trailer, it is only necessary to remove the grille 18 to gain access to mounting studs at the grille end 120 of assembly 10. The mounting studs at the blower end 122 are outside housing 118, and thus the blower module 16 need not be removed. The wiring harness 76 is placed into position, the access cover over the electrical terminal blocks 78 is removed, and the electrical connections from the wiring harness 76 to the terminal blocks 78 are made. The liquid, hot gas and suction lines from the host unit are then connected to the external refrigerant line connectors 112, 114, and 116, which are outside housing 118. Maintenance on blower module 16 is easily and quickly performed by unbolting the blower module 16 from the second end 122 of housing 118. Maintenance of the refrigeration and electrical components mounted between evaporator coil 52 and the second end 122 of housing 118 is also performed by removing the blower module 16. Maintenance of the electrical components mounted between evaporator coil 52 and the first end 120 of housing 118 is performed by removing grille 18. Electrical diagnostics may be made simply by removing the external access cover mounted over the electrical terminal blocks 78.

We claim:

1. A refrigerant evaporator assembly suitable for remote mounting to a ceiling of a trailer compartment having a served space to be conditioned, comprising:
    an evaporator module having a metallic base member, an evaporator coil, a refrigerant circuit having refrigeration components, and an electrical circuit having electrical components,
    said base member having first and second axial ends, first and second sides, and upper and lower surfaces,
    said evaporator coil extending substantially from one axial end of the base to the other, and having headers fixed to the upper surface of said base member which orient the evaporator coil towards a predetermined side of the base member as it extends upwardly from a location on the base member intermediate the first and second sides,
    a cover module including a metallic cover member having first and second axial ends which define an inverted U-shaped configuration having a bight portion and first and second depending leg portions,
    said cover module being fixed to said evaporator module, such that said depending leg portions of the metallic cover member are respectively located at the first and second axial ends of said base member,
    said evaporator and cover modules defining a substantially tubular housing having first and second open ends, wherein the first open end is defined by the first side of the base member and by the first side of the metallic cover member, and the second open end is defined by the second side of the base member and the second side of the metallic cover member,
    a grille removably fixed to the first open end of the tubular housing,
    and an evaporator blower module removably fixed to the second open end of said tubular housing,
    whereby the blower module and the refrigeration circuit and electrical circuit components mounted within the tubular housing may be serviced by removal of the blower module, and the grille may be removed for servicing electrical circuit components mounted within the tubular housing, without removing the tubular housing from a ceiling of a trailer compartment.

2. The refrigerant evaporator assembly of claim 1 including an electrical terminal block connected to the electrical circuit components mounted on the evaporator module within the tubular housing, said electrical terminal block being mounted on the lower surface of the base member and adapted to receive an external wiring harness.

3. The refrigerant evaporator assembly of claim 1 including refrigerant connections to the refrigeration circuit components mounted on the evaporator module within the tubular housing, said refrigerant connections being fixed to the metallic cover member, external to the tubular housing, and being adapted to receive hot gas, suction and liquid lines from an external refrigeration unit.

4. The refrigerant evaporator assembly of claim 1 wherein the refrigeration circuit and refrigeration components are all mounted between the evaporator coil and the second open end of the tubular housing.

5. The refrigerant evaporator assembly of claim 1 wherein primary support for the refrigeration circuit and refrigeration components is provided by the evaporator coil headers, permitting removal of the base member without disturbing the evaporator coil or the refrigeration circuit.

6. The refrigerant evaporator assembly of claim 1 wherein the cover module functions as a mounting base for the evaporator coil, with the cover module being adapted for mounting to the ceiling of a trailer compartment, and wherein the metallic base member is removably fixed to the evaporator coil, functioning as a support base for the evaporator during assembly of the evaporator module, and as a condensate drain pan.

7. The refrigerant evaporator assembly of claim 1 wherein certain of the electrical components are mounted between the evaporator coil and the first open end of the tubular housing.

* * * * *